(12) United States Patent
Lee et al.

(10) Patent No.: US 6,964,996 B1
(45) Date of Patent: Nov. 15, 2005

(54) PENTABLOCK COPOLYMER AND MANUFACTURING METHOD OF THE SAME

(75) Inventors: Kwanyoung Lee, Daejeon (KR); Young Jin Kim, Daejeon (KR); Jong Kim, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 10/624,251

(22) Filed: Jul. 22, 2003

(30) Foreign Application Priority Data

Oct. 10, 2002 (KR) ...................... 10-2002-0061654

(51) Int. Cl.[7] .......................... C08F 297/04; C08L 53/02
(52) U.S. Cl. .......................... 525/89; 525/250; 525/280; 525/332.9; 525/271; 525/272; 525/333.3
(58) Field of Search .......................... 525/89, 250, 280, 525/332.9, 271, 272, 333.3

(56) References Cited

U.S. PATENT DOCUMENTS

| | | | |
|---|---|---|---|
| 3,692,874 A | | 9/1972 | Farrar et al. |
| 4,120,915 A | | 10/1978 | Fodor et al. |
| 4,631,314 A | * | 12/1986 | Tung et al. ................. 525/314 |
| 5,292,819 A | | 3/1994 | Diehl et al. |
| 5,399,627 A | * | 3/1995 | Diehl et al. ................. 525/314 |
| 5,532,319 A | | 7/1996 | Asahara et al. |
| 5,583,182 A | | 12/1996 | Asahara et al. |
| 6,576,686 B1 | * | 6/2003 | Delme et al. ................. 523/172 |

OTHER PUBLICATIONS

Ahmad, Husain et al.; "Application of a Chemical Group Contribution Technique for Calculating Solubility Parameters of Polymers"; Polymer Engineering and Science; Sep. 1979; pp. 858-863; vol. 19, No. 12.

Cho, Jae Cheol et al.; "Microstructure Effect in the Coupling Reactions of Polymeric Organolithium Compounds Using Chlorosilanes"; Journal of Polymer Science (JPS): Part A: Polymer Chemistry; 1998; pp. 1743-1753; vol. 36.

Cohen, Robert E. et al.; "Properties of Block Copolymers and Homopolymer Blends Comprised of 1,2-Polybutadiene and 1,4-Polybutadiene"; Macromolecules; 1982; pp. 370-375; vol. 15.

Hamley, Ian W.; "The Physics of Block Copolymers"; pp. 2-7 and 24-28; Oxford University Press; Oxford, U.K. 1998.

* cited by examiner

Primary Examiner—James J. Seidleck
Assistant Examiner—Olga Asinovsky
(74) Attorney, Agent, or Firm—Squire, Sanders & Dempsey LLP

(57) ABSTRACT

The present invention relates to a ternary copolymer represented by the following formula (1) of the penta-block structure, wherein the molecular weight is 50,000 to 400,000, pB is more than 70% of 1,4 structure, the content of pS is in range of 5% to 50%, and pB and pI are in a weight ratio of pB/pI≧1.

$$pS\text{-}pI\text{-}pB\text{-}pI\text{-}pS \qquad (1)$$

Wherein, pS is vinyl aromatic polymer, pB is polybutadiene and pI is polyisoprene.

The block copolymer in the present invention with the structure, in which polyisoprene block is inserted between vinyl aromatic polymer block and polybutadiene block, has high mechanical properties such as tensile strength. The manufacturing method of the ternary block copolymer with penta-block structure is also provided.

5 Claims, No Drawings

PENTABLOCK COPOLYMER AND MANUFACTURING METHOD OF THE SAME

PRIORITY REFERENCE TO PRIOR APPLICATION

This application claims benefit under 35 U.S.C. § 119 of Korean patent application number 10-2002-0061654, entitled "Ternary Block Copolymer and Manufacturing Method of the Same," filed on Oct. 10, 2002, by inventors Kwanyoung Lee, Young Jin Kim and Jong-geun Kim.

BACKGROUND OF THE INVENTION

1. Field of the Invention

The present invention relates to a block copolymer comprised of vinyl aromatic polymer block and polybutadiene block, and the method of preparing the same, wherein polyisoprene block is present between the blocks of vinyl aromatic polymer and polybutadiene. More specifically, the present invention relates to a block copolymer comprised of vinyl aromatic polymer and polybutadiene with enhanced mechanical strength. By changing the relative contents of each polymer block, mechanical property of the block copolymer can be readily controlled.

2. Description of the Related Arts

Styrenic block copolymer composed of polymer blocks of vinyl aromatic monomer and conjugated diene has generally diblock or triblock structure and is regarded as a thermoplastic elastomer. The polystyrene-block-polybutadiene-block-polystyrene(SBS), where the conjugated diene is butadiene, is one of the common styrenic block copolymer (SBC). SBS has a triblock structure comprising the soft middle block of polybutadiene and the hard blocks of polystyrene at the both ends. Such a combination of polymer blocks and structural characteristics provide useful properties applicable to a wide range of area as a thermoplastic elastomer. Polystyrene block and polybutadiene block of SBS do not mix each other and constitute a micro phase separation. Such a phenomenon differs from the phase separation of the blend of two different homo polymer, since polystyrene block and polybutadiene block in SBS are connected by covalent bond. The block sequence that the middle block is elastomeric polymer and the both ends are hard polymer blocks provides a phase separation structure as the hard glassy domains are connected by elastic polymer chains consisting matrix phase. Thus the polymer material has both of thermoplastic and elastomeric character, the former being provided by the glassy phase polymers with high mechanical strength and the latter from soft polymer block with elasticity which is able to store the mechanical stress in the polymer chains. The dual property of SBS as a thermoplastic elastomer finds a wide area of application in asphalt modification, compounding, shoe parts and adhesive applications. The ternary block structure obtained from polystyrene and polyisoprene, SIS (polystyrene-block-polyisoprene-block-polystyrene) is generally used for adhesives application.

Ternary block copolymers comprising styrene, butadiene and isoprene, with various structures were presented. In U.S. Pat. No. 3,692,874, the method of enhancing coupling efficiency by introducing butadiene block polymers at the ends of polyisoprene block is disclosed. In USP 5,292,819 and USP 5,399,627, a radial block copolymer represented by a formula (pS—pI—pB)nX, (n>2) is disclosed. For the purpose of facile coupling reaction to give radial structure, introduction of pB block less than 10 weight %, particularly less than 5 weight % is suggested. In the literature (JPS vol 36 1743–53, 1998), the relatively slow coupling reaction of anionic polymer with polyisoprenyl end using dichlorodimethylsilane as a coupling agent is reported. The coupling efficiency was 79% after 20 hours in benzene solvent. According to this publication, the substituted methyl group of isoprene imposes a larger steric hindrance than butadiene and is ascribed as the main factor resulting in the low efficiency in the coupling reaction. For this reason, only small amount of butadiene is added for end-capping of polyisoprenyl anion and the elastomeric entity of the copolymer is largely composed of polyisoprene. Accordingly, the obtained block copolymer has the properties of SIS, which is composed of polystyrene block and polyisoprene block.

There are examples of block copolymer containing polyisoprene block and polybutadiene block together to enhance heat stability. Generally, the polybutadiene undergoes crosslinking reaction at high temperature, which results in increase of viscosity. On the other hand, polyisoprene, when heated, tend to be less viscous due to bond scission process. Combination of polyisoprene block and polybutadiene block together in a single polymer cross cancels the viscosity change under heat aging condition and increase the heat stability.

In U.S. Pat. No. 4,120,915, disclosed is a block copolymer represented by S-D1-D2, which comprises of polymer blocks of styrene, conjugated diene and the second conjugated diene. Polymer blocks of conjugated diene comprising butadiene and isoprene are introduced to increase heat stability. However, this polymer has over 70% of styrene and the increase of physical property by combining conjugated diene blocks is not mentioned. The polymer has multi-branched structure induced by multi-functional coupling agent.

In U.S. Pat. Nos. 5,532,319 and 5,583,182, described is a ternary block copolymer represented by the general formula (S—B—I)nX, which has an improved heat resistance when incorporated in hot melt adhesive formulation.

Most of the prior arts, described above, suggest the addition of a little amount of butadiene at the ends of the vinyl aromatic-isoprene block copolymer to improve the efficiency of coupling reaction or to increase the heat resistance. But enhanced mechanical property of vinyl aromatic-butadiene block copolymer accompanied with combination of polysisoprene and polybutadiene was not described and control of the content of vinyl aromatic component without sacrifice of mechanical strength was not mentioned.

Commercial product of SBS generally has about 30 weight % of styrene content. If the styrene content is lower than this, mechanical strength is drastically affected. The content of styrene used in the SBS product is in the vicinity of limiting point for the polymer to maintain thermoplastic elastomer character derived from effective phase separation. However, styrene content in the block copolymer also affects its melt and solution viscosities, both of which are indicators of processability of the block copolymer as well as its mechanical properties such as tensile strength and hardness. Variations in such physical properties and contents of styrene are in demand depending on specific application.

In SIS where isoprene is used instead of butadiene, at 15 weight % of vinyl aromatic content, sufficient mechanical properties can be obtained due to the greater difference in solubility parameter of two components, compared with the vinyl aromatic-butadiene block copolymer. According to the thermodynamic theory, the phase separation of the block copolymer depends on the interaction parameter of the block components, the molecular weight of the block copolymer and the relative content of the components. (Hamley, I. W., The Physic of Block Copolymers; Oxford University Press; Oxford, U.K. 1998). The interaction parameter is determined by the difference of solubility parameter of the components of the block copolymer. These three factors simultaneously affect the over-all phase separation of block copolymer. Accordingly, in order to obtain effective phase separation and maintain the property of the thermoplastic elastomer when the relative content is changed, compensation by controlling other factors such as interaction parameter or the molecular weight is needed. The present invention, in this regard, provides a block copolymer of vinyl aromatic monomer, butadiene, and isoprene with various relative content of components without sacrificing physical properties as a thermoplastic elastomer, derived under in depth consideration of the thermodynamic parameters which affect phase separation.

SUMMARY OF THE INVENTION

The present invention relates to a block copolymer having excellent mechanical properties, comprised of vinyl aromatic polymer block and polybutadiene block, and the method of preparing the same, wherein polyisoprene block is inserted between the blocks of vinyl aromatic polymer and polybutadiene. In particular, the present invention relates to a ternary block copolymer with penta-block structure represented by the formula (1), wherein the molecular weight is 50,000 to 400,000, pB has more than 70% of 1,4 structure, the content of pS is 5 weight % to 50 weight % and pB and pI are in a weight ratio of pB/pI≧1.

pS-pI-pB-pI-pS                                          (1)

Wherein, pS is vinyl aromatic polymer, pB is polybutadiene and pI is polyisoprene.

The present invention further relates to a manufacturing method of the ternary block copolymer comprising the steps of:

a) making living polymer by contacting vinyl aromatic monomer with organolithium initiator in an inactive hydrocarbon solvent under anion polymerization condition;

b) polymerizing diblock living polymer by adding isoprene monomer to the above living polymer;

c) preparing tri-block living polymer by adding butadiene monomer, in addition, to the above diblock living polymer; and d) conducting coupling reaction by adding coupling agent to the above tri-block living polymer.

DESCRIPTION OF THE PREFERRED EMBODIMENTS

The ternary block copolymer of the present invention has a pentablock structure and represented by the formula (1)

pS-pI-pB-pI-pS                                          (1)

wherein, pS is vinyl aromatic polymer, pB is polybutadiene and pI is polyisoprene.

The ternary block copolymer of the invention has a molecular weight of 50,000 to 400,000, a middle block of polybutadiene of more than 70% of 1,4 structure and pS content of 5% to 50%. Polybutadiene and polyisoprene blocks are present in a weight ratio of pB/pI≧1.

The copolymer of the present invention has a structure of ternary block copolymer in which polyisoprene block is located between vinyl aromatic polymer block and polybutadiene block. The block copolymer of the present invention has an enhanced mechanical strength due to the larger difference in the solubility parameter of vinyl aromatic polymer and polyisoprene than the combination of vinyl aromatic polymer and polybutadiene.

The ternary block copolymer of the present invention and the method of preparing the same are further explained in detail. The ternary block copolymer of the present invention is a pentablock copolymer represented by the formula, pS-pI-pB-pI-pS in which pS is the vinyl aromatic polymer block, pB is polybutadiene block and pI is polyisoprene block. The block copolymer of the present invention has a molecular weight in the range of 50,000 to 400,000, wherein PB has more than 70% of 1,4 structure, the content of vinyl aromatic polymer is in range of 5% to 50%, and pB and pI are in a weight ratio of pB/pI≧1.

The vinyl aromatic polymer of the present invention are polymers of styrene, α-methylstyrene, and alkyl substituted styrenes such as o-methylstyrene, and p-tert-butylstyrene. Preferable vinyl aromatic polymers are polymer of styrene, α-methylstyrene and p-methylstyrene. Particularly preferable is the polystyrene.

Styrenic block copolymers have a thermoplastic elastomer property by the micro phase separation. The phase separation is theoretically effected by the molecular weight, the relative contents of polymer component and interaction parameter($\chi$). The interaction parameter is determined by difference of the solubility parameter($\delta$) of the polymers constituting each block as shown in equation ①.

$$\chi_{12} = (\delta_1 - \delta_2)^2 / RT \geq 0 \qquad ①$$

The interaction parameter has a positive value and the higher interaction parameter value, derived from the larger difference in solubility parameter, indicates strong segregation of microphase domains of block copolymer. According to the literature (Robert E. Cohen, D. E. Wilfong, *Macromolecules*, 1982, 15, 370), the solubility parameter is listed as 9.12 $(cal/cm^3)^{1/2}$ for polystyrene, 8.38 $(cal/cm^3)^{1/2}$ for 1,4-polybutadiene and 8.22 $(cal/cm^3)^{1/2}$ for 1,4-polyisoprene and it is also 8.62 $(cal/cm^3)^{1/2}$ for α-methylpolystyrene, 9.00 $(cal/cm^3)^{1/2}$ for o-methylstyrene and 9.00 $(cal/cm^3)^{1/2}$ for p-methylstyrene. (Husan Ahmed, M Yassen. *Polym. Eng. Sci*, 1979, 19, 858). Accordingly, a block copolymer of styrene and isoprene has a larger interaction parameter value than the couple of polystyrene and polybutadiene and shows advantage in the micro phase separation. The ternary block copolymer of the present invention is characterized in that it has the block sequence pS-pI-pB-pI-pS, where pI block having advantage in micro phase separation is inserted between pS block and pB block of SBS. The block sequence is very important since the presence of pI block between pS block and pB block makes the strong phase separation. Accordingly, high value of interaction parameter of the system provides advantage that other factors affecting the phase separation, such as molecular weights and the relative content of the block polymer can be changed in a wider range without weakening phase separation. The effective phase separation of the block copolymer can be translated into an enhancement in the mechanical strength.

Polybutadiene can be made as 1,4-polybutadiene or 1,2-polybutadiene depending on the structure of polymer. Anionically prepared polybutadiene has mainly 1,4-structure with minor 1,2-structural moiety in the range of around 10%. Addition of modifier chemical to the polymerization medium such as ether compound like tetrahydrofuran, or amine compound like tetramethylethylenediamine could increase the content of 1,2-structure. According to the present invention, preferably, the content of 1,4-structure of pB block is more than 70%.

According to the present invention, the preferred ratio of pI and pB in the ternary block copolymer is pB/(pB+pI)≧0.5 or pB/pI≧1. Since polyisoprene block is introduced to improve the physical properties of polystyrene-polybutadiene block copolymer, the content of included polyisoprene should not be higher than 50% of total elastomeric content including polybutadiene and polyisoprene.

In the ternary block copolymer of the present invention, the content of vinyl aromatic polymer can be in the range of 5 to 95%. Preferred content of vinyl aromatic polymer is in the range of 5% to 50%, further preferably 5–35% range. The molecular weight of the vinyl aromatic polymer block is not limited. But for the mechanical strength property and the application property, it is in the range of 5,000 to 30,000, preferably, it is in range of 8,000 to 20,000. The total molecular weight of the ternary block copolymer of the invention is in the range of 50,000 to 400,000, preferably, 80,000 to 300,000.

The manufacturing method of the present invention is the preparation process of the ternary block copolymer with pentablock structure represented as pS-pI-pB-pI-pS in which pS is vinyl aromatic polymer, pB is polybutadiene and pI is polyisoprene. It is a block copolymer where the molecular weight is in range of 50,000 to 400,000, pB has more than 70% of 1,4 structure, the content of vinyl aromatic polymer is in the range of 5% to 50%, and pB and pI are in a weight ratio of pB/pI≧1.

The manufacturing method of preparation comprises the steps of:
a) making living polymer by adding an organolithium initiator to vinyl aromatic monomer in an inactive hydrocarbon solvent and polymerizing it until fully consumed;
b) polymerizing diblock living polymer by adding isoprene monomer to the above living polymer and polymerizing it until fully consumed;
c) preparing tri-block living polymer by adding butadiene monomer to the above diblock living polymer and polymerizing it until fully consumed; and
d) conducting coupling reaction by adding coupling agent to the above tri-block living polymer.

The more detailed method of preparation is described in the following.

The present invention relates to the preparation method of vinyl aromatic-isoprene-butadiene ternary block copolymer with enhanced mechanical property due to the larger difference in solubility parameter between vinyl aromatic polymer and polyisoprene when polyisoprene block is introduced between the vinyl aromatic polymer and polybutadiene block.

The polymerization steps of block copolymer of the present invention are illustrated in detail. The polymers of the present invention are produced by anionic polymerization. The first step to make a living polymer of vinyl aromatic monomer includes contacting the vinyl aromatic monomer and organolithium initiator in an inactive hydrocarbon solvent and polymerizing it until the monomer is fully consumed. The resulted living polymer is in the form of [vinyl aromatic polymer]-Li. In the present invention, vinyl aromatic monomer is one or more monomer selected from styrene, α-methylstyrene, p-methylstyrene, and p-tert-butylstyrene and 1,3-dimethylstyrene, and most preferably styrene is used. The inactive hydrocarbon solvent is selected from the usual solvents known for anion polymerization. In more detail, used are cyclohexane or other cyclic aliphatic hydrocarbon, and the linear aliphatic hydrocarbon such as n-hexane, n-heptane. Preferred inactive hydrocarbon solvent is cyclohexane, a mixture of cyclohexane and n-hexane, or a mixture of cyclohexane and n-heptane. For the organolithium initiator, it is selected from the usual anion polymerization initiators.

Preferably, n-butyllithium or sec-butyllithium is used. The second step is to synthesize diblock living polymer of the type of [vinyl aromatic polymer]-[polyisoprene]-Li by adding isoprene monomer to the above living polymer and polymerizing it until fully consumed. The third step is to prepare tri-block living polymer by adding butadiene monomer to the above diblock living polymer to give [vinyl aromatic polymer]-[polyisoprene]-[polybutadiene]-Li. In the last coupling step, pentablock copolymer of the structure of [vinyl aromatic polymer]-[polyisoprene]-[polybutadiene]-[polyisoprene]-[vinyl aromatic polymer] is prepared by adding coupling agent with functional groups which are able to couple with the anionic of the above tri-block living polymer. The functional groups of the coupling agent may be halogen, double bond or ester group, which can react with anion. Preferred coupling agents with two coupling functional group are di-halogenated alkanes such as dibromoethane, dichloroethane, dibromomethane, and dichloromethane and di-halogenated group IVB compounds such as dichlorodimethyltin, dichlorodiphenyltin, dichlorodimethylsilane, and dichlorodiphenylsilane. Preferred coupling agents with three coupling functional groups are trichloromethylsilane, trichlorophenylsilane, trichloromethyltin, trichlorophenyltin and coupling agents with four coupling functional groups are tetrachlorosilane, tetrabromosilane, tetrachlorotin, and tetrabromotin. For the coupling agent with two double bonds, there is divinylbenzene. The coupling agent of the present invention is one or more selected from these compounds. When the coupling agent with two functional groups is used, block copolymer of linear structure is obtained, while the coupling agent with more than 3 bonding functional groups is used, block copolymer of radial or star structure is obtained.

The reaction temperature for each step may be either same or different and constant temperature condition or adiabatic condition may be used. The reaction temperature used is from −10° C. to 150° C., preferably from 10° C. to 100° C. In the ternary block copolymer of the invention, the content of vinyl aromatic is in the range of 5% to 95% before and after coupling reaction. For the mechanical strength and application property, 5% to 50% is preferable and most preferable is 5% to 35% range. There is no specific value for the molecular weight of the vinyl aromatic block. Yet for the mechanical strength and application property, it is in the range of 5,000 to 30,000 and more preferably 8,000 to 20,000. The molecular weight of the ternary block copolymer after coupling reaction is in the range of 50,000 to 400,000. Preferably 80,000 to 300,000. The coupling efficiency is in the range of 10% to 100%. Preferred coupling efficiency is in the range of 30% to 100%. The most preferable is 50% to 100% range.

The present invention is described in detail with the following examples. However, the present invention is not limited to the illustrated examples.

EXAMPLE 1

Under nitrogen atmosphere, into a 2 L pressure reactor, added were 960 g of cyclohexane and 24 g of styrene. At 60° C., 0.0023 mole of n-butyllithium was added and the polymerization was initiated. Reaction temperature was monitored. Isoprene 24 g was added 10 min. after the maximum temperature point and the polymerization reaction was continued. Butadiene 112 g was added 2 min after the polymerization reached the highest temperature point. Dichlorodimethylsilane 0.0001 g diluted in cyclohexane was added after the polymerization temperature reached maximum point and coupling reaction was conducted. Small amount of methyl alcohol was added to deactivate the living polymer and antioxidant was added. Afterward the solvent was eliminated by steam stripping and the crumb type polymer was collected. The polymer crumb was dried using roll mill.

EXAMPLE 2

Polymerization was carried out following the same procedure and recipe as the example 1, except that the amount of added isoprene was 40 g and the added amount of butadiene was 96 g.

EXAMPLE 3

Polymerization was carried out following the same procedure and recipe as the example 1, except that the amount of added isoprene was 56 g and the added amount of butadiene was 80 g.

COMPARATIVE EXAMPLE 1

Under nitrogen atmosphere, into a 2 L pressure reactor, added were 960 g of cyclohexane and 24 g of styrene, and mixed together. At 60° C., 0.0023 mol of n-butyllithium was added and the polymerization was initiated. The reaction was exothermic. Butadiene 136 g was added 10 min after the highest reaction temperature was reached. The coupling reaction was carried out by adding 0.001 mol of dichlorodimethylsilane after the polymerization of butadiene reached the highest temperature. To the polymerized living polymer solution, small amount of methyl alcohol was added to eliminate the activity of the living polymer completely.

Antioxidant was added. Afterwards, solvent was eliminated by steam stripping and the crumb type of polymer was collected. The resulted polymer crumb was dried using a roll mill at 110° C.

EXAMPLE 4

The molecular weights were determined for the product obtained from Example 1, 2, 3 and Comparative Example 1 by gel permeation chromatography(GPC). Polymer sheet was prepared using hot press from the roll mill dried polymer. A dumbell type of test specimen was cut out from the pressed sheets and the mechanical properties were measured using Instron universal test machine. The analysis by GPC and the result of mechanical properties are listed in the table 1.

TABLE 1

|  | Comparative Example 1 | Example 1 | Example 2 | Example 3 |
|---|---|---|---|---|
| Styrene (g) | 24 | 24 | 24 | 24 |
| Isoprene (g) | — | 24 | 40 | 56 |
| Butadiene (g) | 136 | 112 | 96 | 80 |
| Isoprene content, wt. % | 0 | 15 | 25 | 35 |
| Molecular weight (g/mol) | 276,000 | 243,000 | 279,000 | 251,000 |
| Coupling efficiency (%) | 84 | 82 | 69 | 72 |
| Tensile strength (Kgf/cm$^2$) | 22 | 30 | 93 | 126 |
| Elongation (%) | 400 | 550 | 1100 | 1250 |
| 300% Modulus (Kgf/cm$^2$) | 18 | 18.5 | 18.4 | 18.2 |

As can be observed from the Comparative Example 1 in the table, the block copolymer consisted of polystyrene and polybutadiene for the given polymer structure, in particular with low styrene content, has a low tensile strength. But the ternary block copolymers with polystyrene-polyisoprene-polybutadiene sequence in Example 1, 2, and 3 showed increased tensile strength.

Effect of Invention

As described above, the copolymer of the present invention has increased tensile strength when the block copolymer has a polyisoprene block inserted between polystyrene block and polybutadiene block. The unique structure of the invention provides the block copolymer of low styrene content with high tensile strength and other physical properties derived from low styrene content, which is required for various application.

What is claimed is:

1. A pentablock copolymer represented by the formula (1), wherein the molecular weight is 50,000 to 400,000, pB has more than 70% of 1,4 structure, the content of pS is 5% to 50% by weight and pB and pI are in a weight ratio of pB/pI≧I pS-pI-pB-pI-pS                   (1)

Wherein, pS is vinyl aromatic polymer, pB is polybutadiene and pI is polyisoprene.

2. Then pentablock copolymer of claim 1, wherein the vinyl aromatic polymer is a polymer of one or more monomers selected from the group of styrene, α-methylstyrene, o-mtheylstyrene, p-methylstyrene, p-tert-methylstyrene.

3. The pentablock copolymer of claim 1, wherein the vinyl aromatic polymer is polystyrene.

4. The pentablock copolymer of claim 1, wherein the content of vinyl aromatic polymer is in the range of 5% to 35% by weight.

5. The pentablock copolymer of claim 1 or in claim 4, wherein the molecular weight of the vinyl aromatic polymer is in the range of 8,000 to 20,000.

* * * * *

UNITED STATES PATENT AND TRADEMARK OFFICE
CERTIFICATE OF CORRECTION

PATENT NO. : 6,964,996 B1
DATED : November 15, 2005
INVENTOR(S) : Kwanyoung Lee et al.

It is certified that error appears in the above-identified patent and that said Letters Patent is hereby corrected as shown below:

Column 8,
Line 44, change "pB/pI$\geq$I" to -- pB/pI$\geq$1 --.
Line 49, change "Then pentablock copolymer of claim 1, wherein the" to
-- The pentablock copolymer of claim 1, wherein the --.

Signed and Sealed this

Eighteenth Day of April, 2006

JON W. DUDAS
*Director of the United States Patent and Trademark Office*